(12) United States Patent
Palamarchuk et al.

(10) Patent No.: US 9,501,755 B1
(45) Date of Patent: Nov. 22, 2016

(54) CONTINUOUS NAVIGATION FOR UNMANNED DRIVE UNITS

(71) Applicant: Amazon Technologies, Inc., Reno, NV (US)

(72) Inventors: Andriy Palamarchuk, Winchester, MA (US); Peter R. Wurman, Acton, MA (US)

(73) Assignee: Amazon Technologies, Inc., Reno, NV (US)

( * ) Notice: Subject to any disclaimer, the term of this patent is extended or adjusted under 35 U.S.C. 154(b) by 507 days.

(21) Appl. No.: 14/038,528

(22) Filed: Sep. 26, 2013

(51) Int. Cl.
*G06Q 10/08* (2012.01)
(52) U.S. Cl.
CPC .............................. *G06Q 10/08355* (2013.01)
(58) Field of Classification Search
None
See application file for complete search history.

(56) References Cited

U.S. PATENT DOCUMENTS

| | | | | |
|---|---|---|---|---|
| 2004/0028258 A1* | 2/2004 | Naimark | ............... | G06K 9/4609 382/103 |
| 2007/0288123 A1* | 12/2007 | D'Andrea | ............... | B66F 9/063 700/214 |
| 2008/0051985 A1* | 2/2008 | D'Andrea | ......... | G05B 19/41895 701/410 |
| 2015/0109338 A1* | 4/2015 | McKinnon | ......... | G06F 17/30265 345/633 |

\* cited by examiner

*Primary Examiner* — Wesley Tucker
(74) *Attorney, Agent, or Firm* — Lee & Hayes, PLLC (57) ABSTRACT

In an infrastructure that uses a mobile order fulfillment system, robotic drive units may be dispatched and instructed to bring inventory holders to a workstation where at least one of the inventory holders may be operated upon. A random pattern or other image may be applied to a floor surface of the infrastructure, from which a map may be created that associates locations within the infrastructure to different portions of the image. A robotic drive unit may then reference the map along with images of the floor surface captured by its camera in order to determine its current location, as well as how to reach a desired destination.

20 Claims, 10 Drawing Sheets

CONTINUOUS NAVIGATION FOR UNMANNED DRIVE UNITS

BACKGROUND

Modern inventory systems, such as those used in mail order warehouses, supply chain distribution centers, airport luggage systems, and custom-order manufacturing facilities, face significant challenges in responding to requests for inventory items. As inventory systems grow, the challenges of simultaneously completing large numbers of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance.

Increasingly, mobile order fulfillment systems are used within inventory facilities to address these and other concerns. A mobile order fulfillment system may provide automation for bringing ordered items to central workstations for workers to select and pack the ordered items in preparation for shipping. Mobile order fulfillment systems such as this can greatly increase efficiencies within an order fulfillment facility.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This application describes, in part, techniques for use in an infrastructure that uses a mobile order fulfillment system in which robotic drive units may be dispatched and instructed to bring inventory holders to a workstation and/or to store inventory holders in a storage area. The techniques include applying an "identifiable pattern" or "image", such as a random pattern, to a floor surface of the infrastructure, from which a map may be created that associates locations within the infrastructure to different portions of the image. A robotic drive unit may then reference the map along with images of the floor surface captured by its camera in order to determine its current location, as well as how to reach a desired destination.

Figure 1:
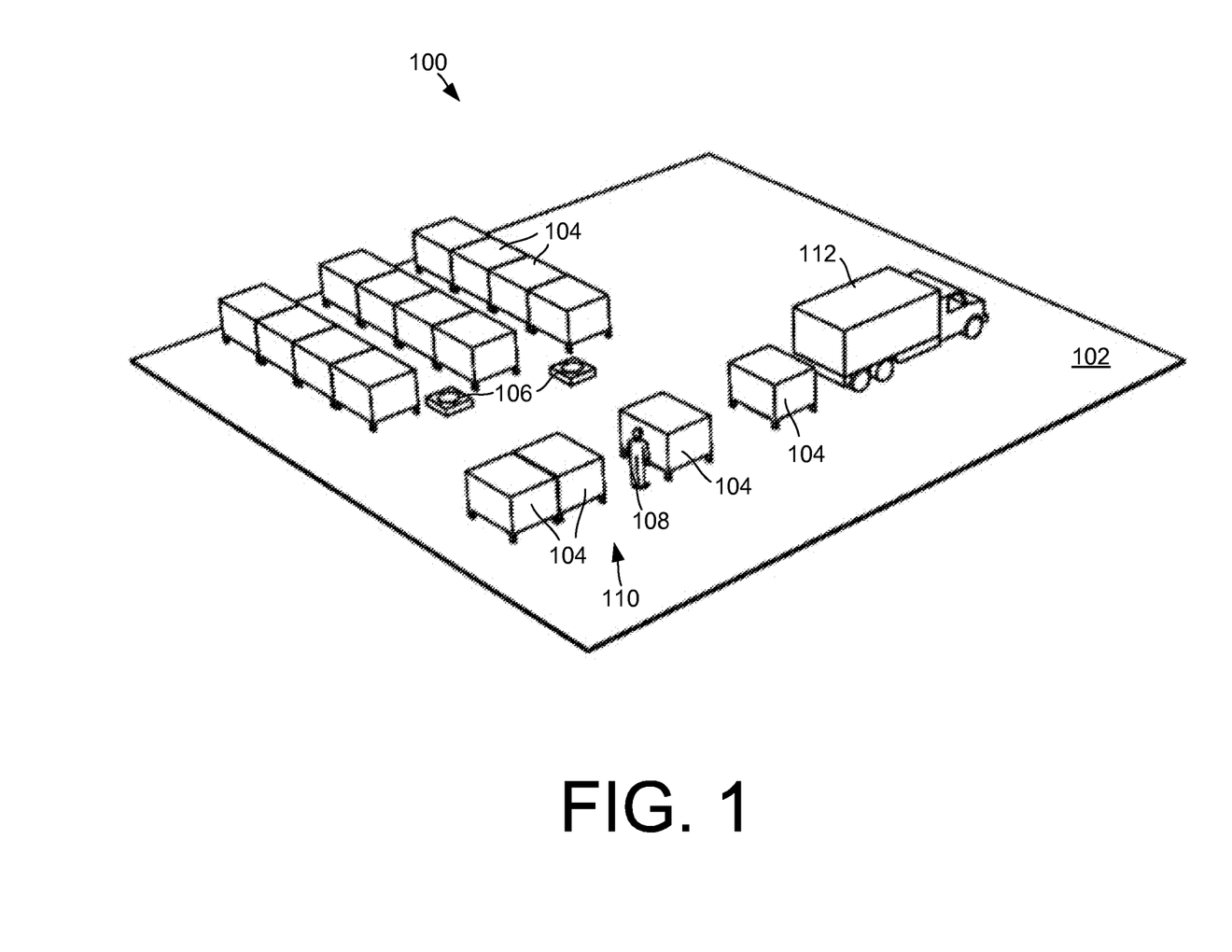
FIG. 1 is a perspective diagram of an inventory storage and order fulfillment system that includes an inventory facility, having a floor surface that defines an identifiable pattern, and multiple unmanned drive units that may navigate within the facility using the identifiable pattern on the floor.

FIG. 1 illustrates the components of an inventory storage and order fulfillment system or infrastructure 100 that includes an inventory facility 102 that is used to store inventory items that are ordered by and shipped to customers or other entities. In the described embodiment, the inventory facility 102 uses an automated robotic mobile fulfillment system in which inventory items are stored in portable inventory holders 104 and moved about the facility 102 by "unmanned" or "robotic" drive units 106. While some robotic drive units 106 may be "unmanned"—and therefore do not transport a human—other robotic drive units (or simply "drive units") described herein may be configured to transport a human, regardless of whether that human controls the navigation of the corresponding drive unit. Within the illustrated environment, inventory holders 104 may be moved to a human worker 108 using the drive units 106 so that the worker can manually retrieve or "pick" ordered items from the inventory holders 104.

As a specific example, a received order may specify a plurality of inventory items. In response to such an order, the inventory holders 104 containing the inventory items are moved by the robotic drive units 106 to a workstation or other area 110 where the worker 108 retrieves the ordered items. In some implementations, inventory items retrieved in this manner may be placed on an additional inventory holder 104 that contains one or more outgoing orders. Once completed, the additional inventory holder 104 may be moved by a robotic drive unit 106 to a shipping workstation or other processing point. In addition, certain inventory holders 104 that have been loaded with specified inventory items may also be moved to or onto a transport vehicle for shipment to a different inventory facility.

As another example, inventory restocking may be performed when receiving new inventory at an inventory facility 102. The mobile fulfillment system identifies one or more inventory holders 104 that are to be used for storage of the incoming inventory items. The robotic drive units 106 bring the identified inventory holders 104 to the worker 108 at the location of the new inventory. The worker 108 can then load the new inventory onto the inventory holders 104. After being loaded, robotic drive units 106 may be used to move the inventory holders 104 to appropriate locations within the inventory facility 102 for storage or to waiting transport vehicles for transport to different inventory facilities 102.

As described in further detail below, the robotic drive units 106 may include a camera pointed substantially downwards for the purpose of capturing images of the floor surface of the inventory facility 102. In some instances, this floor surface may include an image (e.g., a random pattern or other image) that the robotic drive units 106 may utilize in order to navigate about the inventory facility 102. That is, the robotic drive units may reference a map that associates different locations of the facility 102 to different portions of the image on the floor. By doing so, the units 106 may compare the images captured by their respective cameras to the map to determine their current location, as well as to determine a path to reach a desired location.

Figure 2:
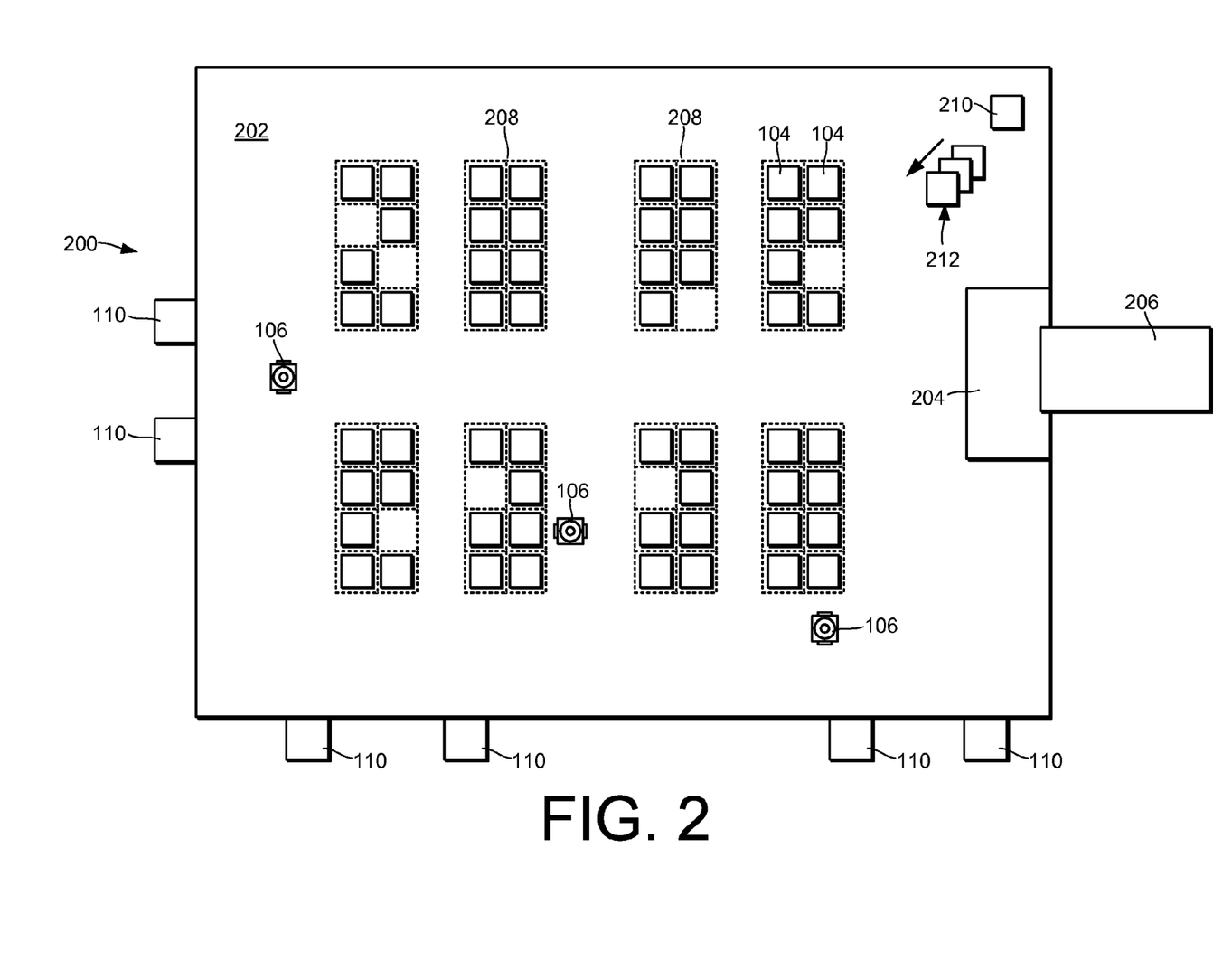
FIG. 2 is a block diagram illustrating an example configuration of an inventory management and order fulfillment system that may be implemented within the inventory facility of FIG. 1.

FIG. 2 illustrates an example configuration of an inventory management and/or order fulfillment system 200 that may be implemented in the inventory facility 102 described above. In the system 200 of FIG. 2, the robotic drive units 106 are used to transport the inventory holders 104 between points within a workspace 202 of an inventory facility. The workspace may include workstations 110, one or more loading docks 204, and cargo compartments 206 of one or more transport vehicles such as the transport vehicle 112 of FIG. 1. The workspace 202 may also include designated locations 208 for placement and storage of the inventory holders 104.

The robotic drive units 106 move the inventory holders 104 between locations within the workspace 202 under the general direction and control of a management component 210, which is also referred to herein as control logic 210. The management component 210 assigns tasks 212 to the robotic drive units 106 and other components of the system and coordinates operation of the robotic drive units 106 in completing the tasks 212. The tasks 212 may relate not only to the movement and processing of inventory holders 104, but also to the management and maintenance of the components of the system 200. For example, the management component 210 may assign portions of the workspace 202 as parking spaces for the robotic drive units 106, the scheduled recharge or replacement of robotic drive unit batteries, the storage of empty inventory holders 104, or any other operations associated with the functionality supported by the system 200 and its various components.

Although shown in FIG. 2 as a single, discrete component, the management component 210 may represent multiple components and may represent or include portions of the robotic drive units 106 or other elements of the system 200. As a result, any or all of the interaction between a particular robotic drive unit 106 and the management module 210 that is described below may in particular embodiments represent peer-to-peer communication between that robotic drive unit 106 and one or more other robotic drive units 106.

The robotic drive units 106 may comprise any devices or components appropriate for use in the system 200 based on the characteristics and configuration of the inventory holders 104 and/or other elements of the system 200. In a particular embodiment, the robotic drive units 106 are self-powered, wheeled devices configured to move autonomously about the workspace 202 without direct human supervision. In general, the robotic drive units 106 may be powered, propelled, and controlled in any manner appropriate based on the configuration and characteristics of the system 200.

The robotic drive units 106 may be capable of communicating with the management component 210 to receive information identifying selected inventory holders 104, to transmit the locations of the robotic drive units 106, and/or to exchange any other suitable information to be used by the management component 210 or the robotic drive units 106 during operation. The robotic drive units 106 may communicate with the management component 210 wirelessly, using wired connections between the robotic drive units 106 and the management component 210, and/or in any other appropriate manner. As one example, particular embodiments of the robotic drive unit 106 may communicate with the management component 210 and/or with one another using 802.11, Bluetooth, or Infrared Data Association (IrDA) standards, or any other appropriate wireless communication protocol. Furthermore, as noted above, the management component 210 may include components of individual robotic drive units 106. Thus, for the purposes of this description and the claims that follow, communications between the management component 210 and a particular robotic drive unit 106 may represent communication between components of a particular robotic drive unit 106.

The inventory holders 104 store inventory items. Inventory items may comprise any objects suitable for storage, retrieval, and/or processing by the system 200. In a particular embodiment, the inventory holders 104 include multiple storage bins with each storage bin capable of holding one or more types of inventory items. The inventory holders 104 are capable of being carried, rolled, and/or otherwise moved by the robotic drive units 106.

In an example implementation, the system 200 may be implemented by a mail or online order warehouse facility, and inventory items may comprise merchandise stored in the warehouse facility. During operation, the robotic drive units 106 may retrieve inventory holders 104 containing one or more inventory items requested in an order to be packed for delivery to a customer. Moreover, in particular embodiments of the system 200, boxes containing completed orders may themselves represent inventory items.

As another example, the system 200 may be implemented by a merchandise-return facility. In such an embodiment, inventory items may represent merchandise returned by customers. Units of these inventory items may be stored in the inventory holders 104 when received at the workspace 202. At appropriate times, a large number of units may be removed from a particular inventory holder 104 and packed for shipment back to a warehouse or other facility. For example, individual units of a particular inventory item may be received and stored in the inventory holders 104 until a threshold number of units of that inventory item have been received. The robotic drive units 106 may then be tasked with retrieving an inventory holder 104 in this state. The inventory holder 104 may then be shipped to another facility, such as a mail-order warehouse.

As another example, the system 200 may be implemented by an airport luggage facility. In such an embodiment, inventory items may represent pieces of luggage stored in the luggage facility. The robotic drive units 106 may retrieve inventory holders 104 storing luggage that is arriving and/or departing on particular flights or luggage that is destined for particular types of processing, such as x-ray or manual searching.

As yet another example, the system 200 may be implemented by a manufacturing facility, and inventory items may represent individual components of a manufacturing kit. More specifically, inventory items may represent components intended for inclusion in an assembled product, such as electronic components for a customized computer system. In such an embodiment, the system 200 may retrieve particular components identified by a specification associated with an order for the product so that a customized version of the product can be built.

More generally, the system 200 may be implemented by or within any facility or system for storing and processing inventory items, and inventory items may represent objects of any type suitable for storage, retrieval, and/or processing in a particular system 200. In addition, the system 200 and the techniques described herein may apply in any environment in which it may be advantageous to move individual, unmanned drive units about an environment.

The workstations 110 may comprise locations designated for the completion of particular tasks involving inventory items. Such tasks may include the removal of inventory items from the inventory holders 104, the introduction of inventory items into the inventory holders 104, the counting of inventory items in the inventory holders 104, the decomposition of inventory items (e.g. from pallet or case-sized groups to individual inventory items), and/or the processing or handling of inventory items in any other suitable manner. In particular embodiments, the workstations 110 may represent the physical locations where a particular task involving inventory items can be completed within the workspace 202. In alternative embodiments, the workstations 110 may represent both the physical location and also any appropriate equipment for processing or handling inventory items, such as scanners for monitoring the flow of inventory items in and out of the system 200, communication interfaces for communicating with the management component 210, and/or any other suitable components.

The workstations 110 can be controlled, entirely or in part, by human workers or may be fully automated. Moreover, the human or automated operators of the workstations 110 may be capable of performing certain tasks with respect to inventory items, such as packing or counting inventory items, as part of the operation of the system 200.

The workspace 202 may include an area associated with the system 200 in which the robotic drive units 106 can move and/or the inventory holders 104 can be stored. For example, the workspace 202 may represent all or part of the floor of a mail-order warehouse in which the system 200 operates. Although FIG. 2 shows an embodiment of the system 200 in which workspace 202 includes a fixed, predetermined, and finite physical space, particular embodiments of the system 200 may include unmanned robotic drive units 106 and inventory holders 104 that are configured to operate within a workspace 202 that is of variable dimensions and/or an arbitrary geometry. Also, while the workspace 202 may be enclosed in a building, alternative embodiments may utilize workspaces 202 in which some or all of the workspace 202 is located outdoors, within a vehicle (such as a cargo ship), or otherwise unconstrained by any fixed structure. Moreover, in particular embodiments, the workspace 202 may include multiple portions that are physically separated from one another, including but not limited to separate floors, rooms, buildings, and/or portions divided in any other suitable manner.

When moving the inventory holders 104 to different locations within the workspace 202, the robotic drive units 106 may dock with and transport the inventory holders 104. The robotic drive units 106 may dock with the inventory holders 104 by connecting to, lifting, and/or otherwise interacting with the inventory holders 104 or in any other suitable manner so that, when docked, the robotic drive units 106 are coupled to and/or support the inventory holders 104 and can move the inventory holders 104 within the workspace 202. While the description below focuses on particular embodiments of the robotic drive unit 106 and inventory holder 104 that are configured to dock in a particular manner, alternative embodiments of robotic drive unit 106 and inventory holder 104 may be configured to dock in any manner suitable to allow the robotic drive unit 106 to move an inventory holder 104 within the workspace 202. Additionally, as noted below, in particular embodiments the robotic drive units 106 may represent all or portions of the inventory holders 104. In such embodiments, the robotic drive units 106 may not dock with inventory holders 104 before transporting the inventory holders 104 and/or the robotic drive units 106 may each remain continually docked with a particular inventory holder 104.

Figure 3:
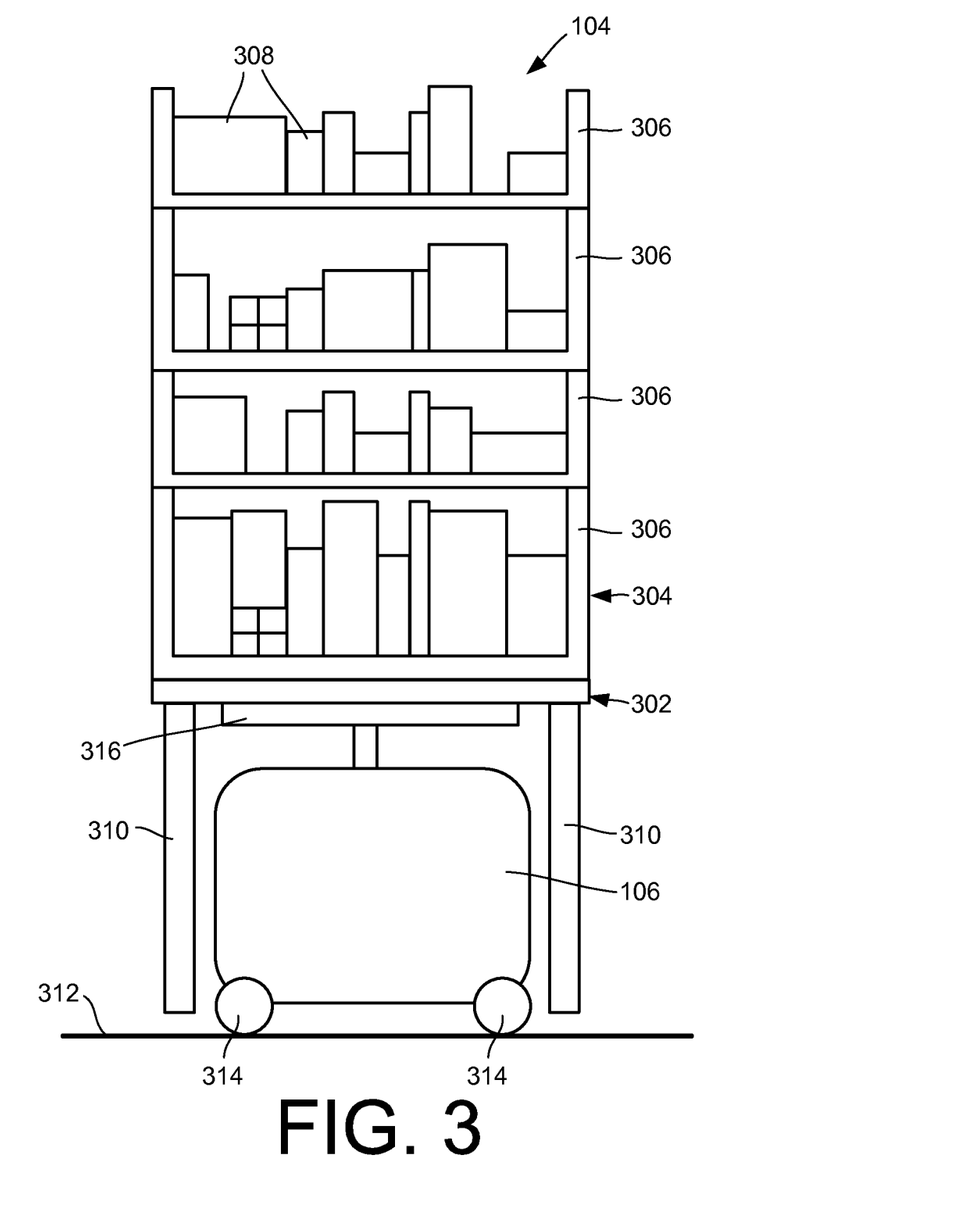
FIG. 3 is a side view showing an example inventory holder and robotic drive unit that may be used in the systems of FIGS. 1 and 2.

FIG. 3 illustrates an example implementation of an inventory holder 104 and a robotic drive unit 106. The inventory holder 104 includes a base or base portion 302 and a storage portion 304. The storage portion may comprise one or more bins or shelves 306. The bins or shelves 306 may be formed integrally with the base 302 and with each other, or may comprise separate stackable and trays that are detachable from each other and/or from the base portion 302.

In some embodiments, the storage portion may have connection points, such as holes, hooks, etc., suitable for use by a manned lift such as a forklift or other drive lift. For example, the storage portion may have slots or hooks for engagement by a forklift or other equipment. In embodiments where the base portion 302 and storage portion 304 are integral, lifting the storage portion 304 by the slots or hooks will also lift the base portion 302. In embodiments where the base portion 302 and the storage portion 304 are detachable, lifting the storage portion 304 by the slots or hooks may separate the storage portion 304 from the base portion 302 so that the storage portion may be moved independently of the base portion 302.

A plurality of inventory items 308 are held or stored by the bins or shelves 306. In some cases, the bins or shelves 306 may have adjustable dividers to provide separate spaces for different inventory items on individual bins or shelves 306.

The inventory holder 104 or the base portion 302 of the inventory holder 104 may have a plurality of legs 310 that extend downward from the base 302 to support the inventory holder on a floor or surface 312 of an inventory facility 102 and/or transport vehicle 112. The legs 310 provide a space above the floor 312 and between each other so that the robotic drive unit 106 can maneuver itself beneath the base portion 302.

The robotic drive unit 106 may comprise a motorized lift having a plurality of wheels 314 and a lift surface 316. One or more of the wheels 314 may be driven to move the drive unit 106 over the floor or surface 312. One or more of the wheels 314 may be steerable to guide the drive unit 106 in different directions or paths.

The lift surface 316 may be configured to dock with the inventory holder 104 by raising the lift surface 316 into engagement with the base 302. In operation, the robotic drive unit 106 may be configured to maneuver itself beneath the inventory holder 104, to raise the inventory holder 104 off of the surface 312 and to move the inventory holder 104 to any desired location under the direction or in response to instructions from the management component 210. After reaching the desired location, the robotic drive unit 106 undocks from the inventory holder 104 by lowering the lift surface 316 and thereby placing the inventory holder 104 back on the floor 312.

Although FIG. 3 illustrates a particular embodiment of robotic drive unit 106 containing certain components and configured to operate in a particular manner, the robotic drive unit 106 may comprise any appropriate component and/or collection of components configured to transport and/or facilitate the transport of inventory holders 104.

As described above, the robotic drive units may include at least one camera, which is aimed toward a predefined surface, such as a floor surface, a wall surface, a ceiling surface, or the like. In one particular example, a robotic drive unit 106 may include a camera pointed substantially downwards towards to a floor surface. The unit 106 may capture images of the floor surface and may compare these images to a pre-existing map to identify the unit's location within a facility as well as to determine how to navigate to other locations in the facility. As such, the floor surface may include an image, which may be painted on, etched in, or otherwise formed within or applied to the floor surface. For instance, the image may be based on multiple different colors painted or applied to the floor, etchings in the floor, natural non-uniform textures of a particular material from which the floor has been made, and/or combinations thereof.

Figure 4:
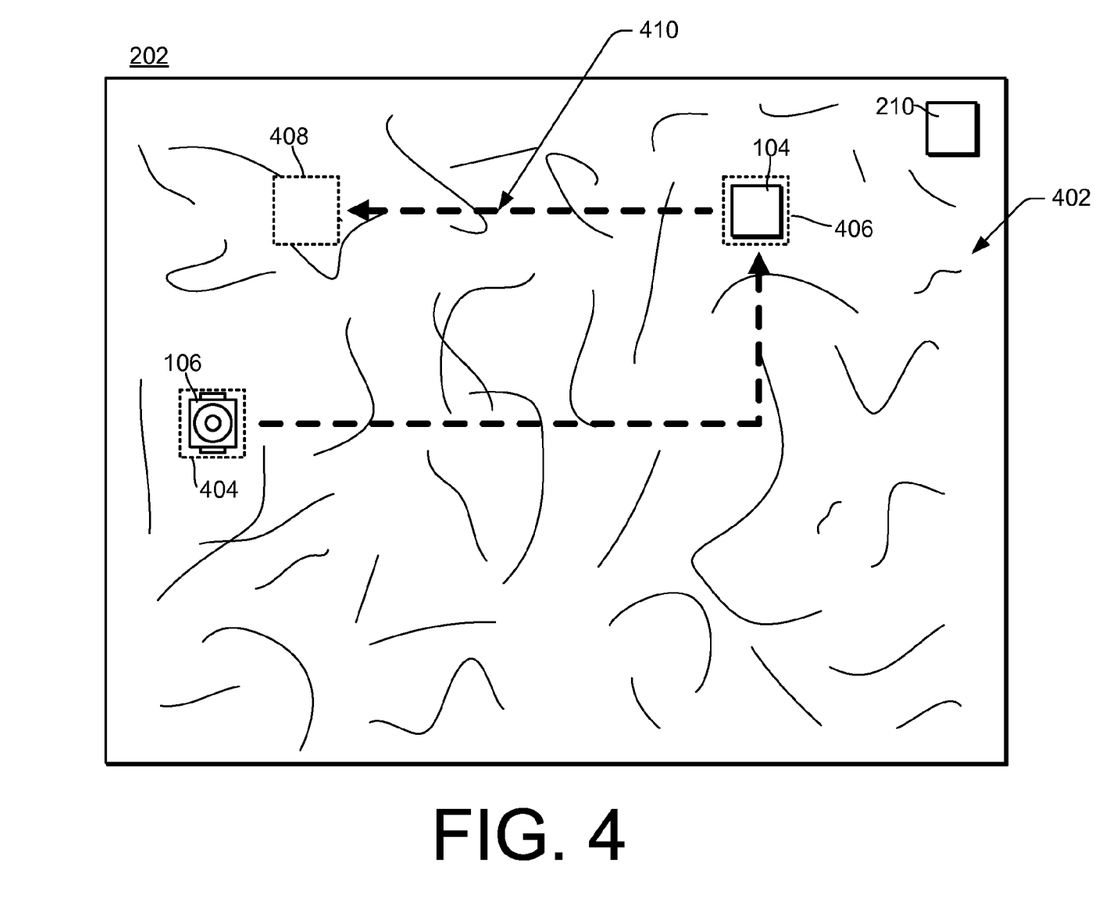
FIG. 4 illustrates an example inventory facility that includes an image or identifiable pattern (here, a random pattern) applied thereto, along with an unmanned drive unit that navigates within the facility using the random pattern. In this example, the drive unit navigates to a portable inventory holder and moves it from a first location to a specified second location.

FIG. 4 illustrates an example inventory facility that includes an image (here, a random pattern 402) applied to a floor surface, along with an unmanned drive unit 106 that navigates within a workspace area 202 of the facility using the random pattern. As illustrated, the drive unit 106 initially resides a location 404 within the workspace 202. Thereafter, the drive unit receives a request to move a portable inventory holder 104 from a first location 406 in the workspace to a second location 408. In response to receiving this request, the drive unit may either reference a map of the workspace 202 stored locally, may request (or simply receive) the map from a remote entity, or may request (or simply receive) an indication of portions of the random pattern 402 that apply to the first and second locations and/or an indication of portions of the random pattern 402 that apply to a path to reach these locations.

After referencing the map or otherwise determining the portions of the random pattern 402 corresponding to a path to the first location 406 and from the first location 406 to the second location 408, the drive unit may determine a path 410 to move along. Thereafter, the drive unit may use its drive mechanism to begin travelling along the path 410. While moving along the path 410, the drive unit may periodically, continuously, or randomly capture images using its camera directed downwards towards the floor and, hence, towards the random pattern 402. The drive unit 106 may compare the portions of the random pattern 402 to the portions of the random pattern determined from the map and corresponding to the path 410 to determine whether the unit 106 is in fact on the path 410. If not, then the unit 106 may correct its path.

Stated otherwise, the unit 106 may utilize image recognition and comparison techniques to determine whether the images captured by the camera represent the portions of the image of the floor surface expected as determined by the map. Further, while this example describes the unit 106 performing the image comparison, in other instances the unit 106 may provide the images captured by its camera to a remote entity for performing the comparison. In either case, after reaching the first location 406, the robotic drive unit 106 may lift the portable inventory holder 104 and move the holder 104 to the second location 408.

Furthermore, in some instances the drive unit 106 may utilize the random pattern 402 along with additional location-determination techniques. For instance, the drive unit 106 may be equipped with global positioning satellite (GPS) technology, which may be used to determine a location of the drive unit according to a first tolerance. The images captured by the camera of the drive unit 106 may then be used to determine the location at a second, lesser tolerance. Stated otherwise, the GPS or other global positioning location technique (e.g., WiFi triangulation, etc.) may be used to locate the drive unit within a particular area, and the map on the floor surface may aid in the determination of the location of the drive unit at a greater level of detail.

Figure 5:
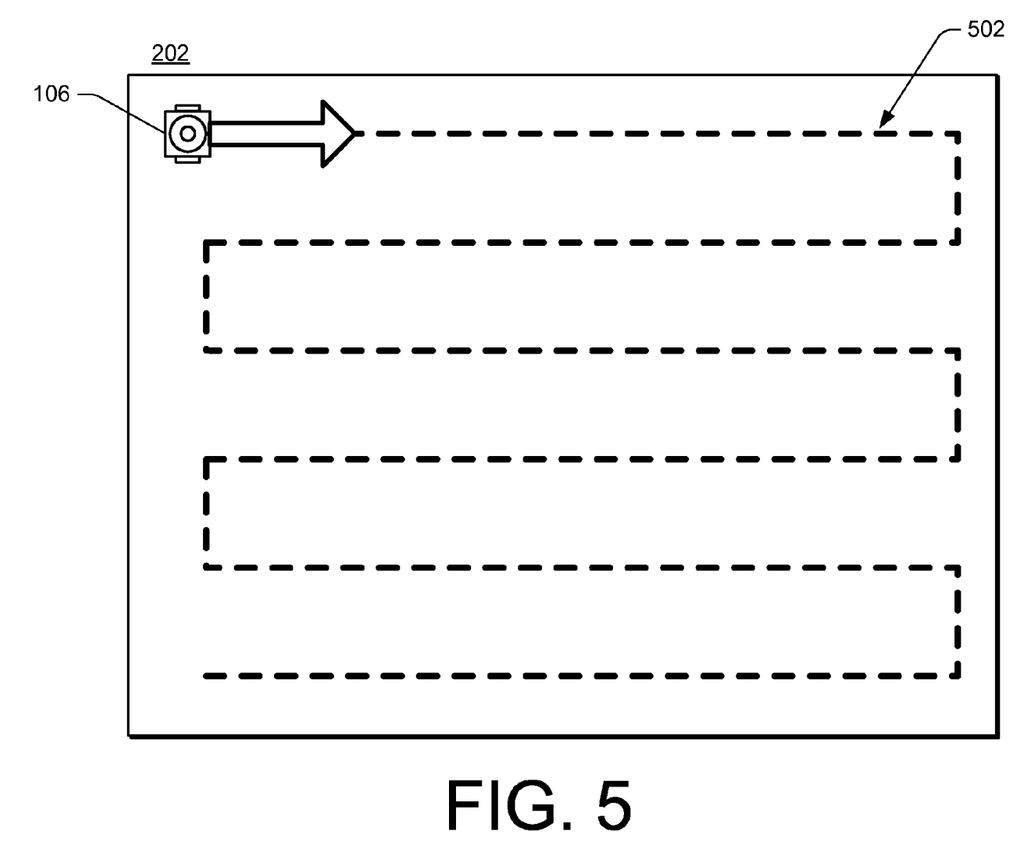
FIG. 5 illustrates an example of an unmanned drive unit applying an identifiable pattern to a floor surface by navigating about a facility and painting the floor while navigating.

FIG. 5 illustrates a robotic drive unit 106 as it begins to apply a random pattern to a floor surface of the workspace 202 by navigating about a facility and painting the floor while navigating. As illustrated, the robotic drive unit 106 has, in this example, been programmed to navigate a path 502 that covers substantially the entire workspace 502. While doing so, the drive unit 106 may paint or otherwise coat the floor to create an image, such as a random pattern or a pre-specified image. While this example describes a single robotic drive unit painting the floor, in other examples multiple robotic drive units may be used.

In addition, while this example illustrates the robotic drive unit 106 as navigating a pre-specified path 502, in other instances one or more units 106 may simply randomly navigate the workspace 202 while painting the floor. Furthermore, in some examples the image may be defined on the floor in another manner. For instance, human workers may apply paint to the floor, either in a random manner, using a paint-by-colors scheme, or the like. In some instances, the applied paint or other coating may be outside the viewable color range of a human eye.

In still other instances, an image (e.g., a random pattern or a pre-specified image) may be etched or burned into the floor, either via a manual or an automated process. In still other instances, certain objects (e.g., foil, plastic of different colors, etc.) may be laid onto the floor surface and sealed. In yet other instances, a material used to create the floor may define an image due to its natural, non-uniform surface. For instance, an exposed aggregate concrete surface may define a unique image across the workspace due to the exposure of different shaped and colored rocks in different locations. In another example, even a smooth concrete or other type of surface may have microscopic differences that may be recognized using fine image recognition. Of course, while a few examples have been provided, it is to be appreciated that the image on the floor surface may be defined and/or created in any other suitable manner. Furthermore, in some instances, fiducial markers (e.g., bar codes, QR codes, etc.) may also be applied to the surface in addition to the image in order to further help the navigation and location-determination of the robotic drive units 106.

After an image is created or otherwise defined in the floor surface (e.g., via the painting robotic drive unit 106 of FIG. 5), the image may be determined and a map may be created that associates locations within the workspace to different portions of the image. As such, objects within the workspace 202 that are stored in different locations within the workspace 202 may be found by the drive units 106 by mapping a location of an object, such as a portable inventory holder 104, to a portion of the image on the floor surface. This map may be created in a number of ways. For instance, a human worker may utilize a camera to capture a birds-eye view of the workspace 202 and may use software to correlate the geographical locations of the workspace 202 to the different portions of the image (and, potentially, any fiducial markers used). In other instances, one or more robotic drive units may navigate about the workspace 202, capturing images of the floor surface and noting the location at which the images have been captured. The robotic drive units 106 may then either create the map by correlating the different portions of the image of the floor surface to the geographical locations, or may provide these images to a remote entity for doing so.

Figure 6:
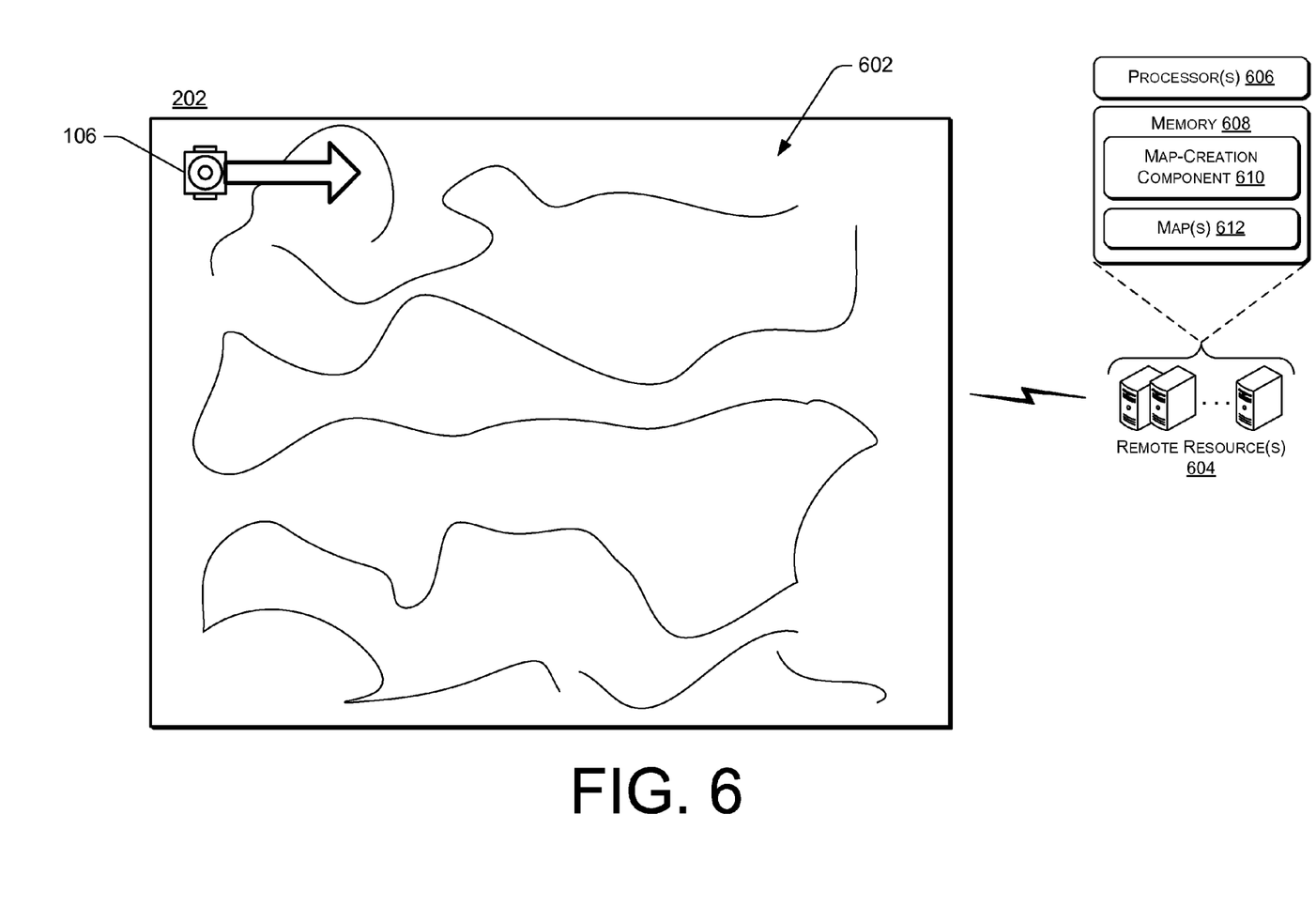
FIG. 6 illustrates an example of an unmanned drive unit navigating about the facility of FIG. 5 to capture images of the resulting identifiable pattern and either creating a map of the facility using the images or uploading the images to a remote entity for creating the map.

FIG. 6 illustrates such an example. Here, an unmanned drive unit 106 navigates about the facility of FIG. 5 to capture images of the image 602 that has been painted onto the floor. The robotic drive unit 106 that captures the images may comprise the same unit or a different unit than the unit that created the image 602. Furthermore, in some instances multiple drive units may capture images, either by traveling in pre-specified paths or random paths, similar to the discussion above with reference to FIG. 5. Utilizing multiple drive units that each capture images for creating a map may create a level of redundancy that results in a map of higher accuracy.

In the illustrated example, after capturing the images, the robotic drive unit 106 may either create the map correlating the image 602 to locations within the workspace 202, or may provide the images to one or more remote resources 604 for creating the map. The unit 106 may communicate with the remote resources 604 over a wired and/or wireless network(s). In some instances, the remote resources 604 may represent resources within the inventory facility, while in other instances the remote resources 604 may represent resources outside of the facility.

In either instance, FIG. 6 illustrates that the remote resources 604 comprise one or more processors 606 and memory 608. The memory 608 may store a map-creation component 610 as well as one or more maps 612 corresponding to different workspaces of the inventory facility and/or other facilities. The map-creation component 610 functions to create a map by correlating locations within a workspace, such as the workspace 202, to portions of an image defined on the surface, such as the image 602. Thereafter, the component 610 may store the resulting map and/or may provide the map back to one or more drive units 106. The maps 612, therefore, may reside remotely from the robotic drive units or onboard the units. In either instance, the maps may be utilized to navigate to one or more desired locations within a particular workspace, such as the workspace 202.

Furthermore, after a map of the workspace 202 has been learned and created, other drive units may learn how the workspace 202 changes. For instance, if new objects, such as inventory, are placed within the workspace, the drive units may identify these obstacles and may update the map. Furthermore, as the floor surface changes (e.g., due to scratches, new markings, etc.), drive units may identify these changes and correspondingly update the map.

In some instances, the drive units may capture images and may provide these to a human operator for analysis. For instance, a drive unit may capture an image (or video) of an object detected by the drive unit and may upload this image to a datastore. A human operator may then view the image from the datastore and determine whether the detected object is in fact an obstacle for which the map should be updated to reflect, or whether the object is something non-permanent, such as a human worker within the workspace.

Figure 7:
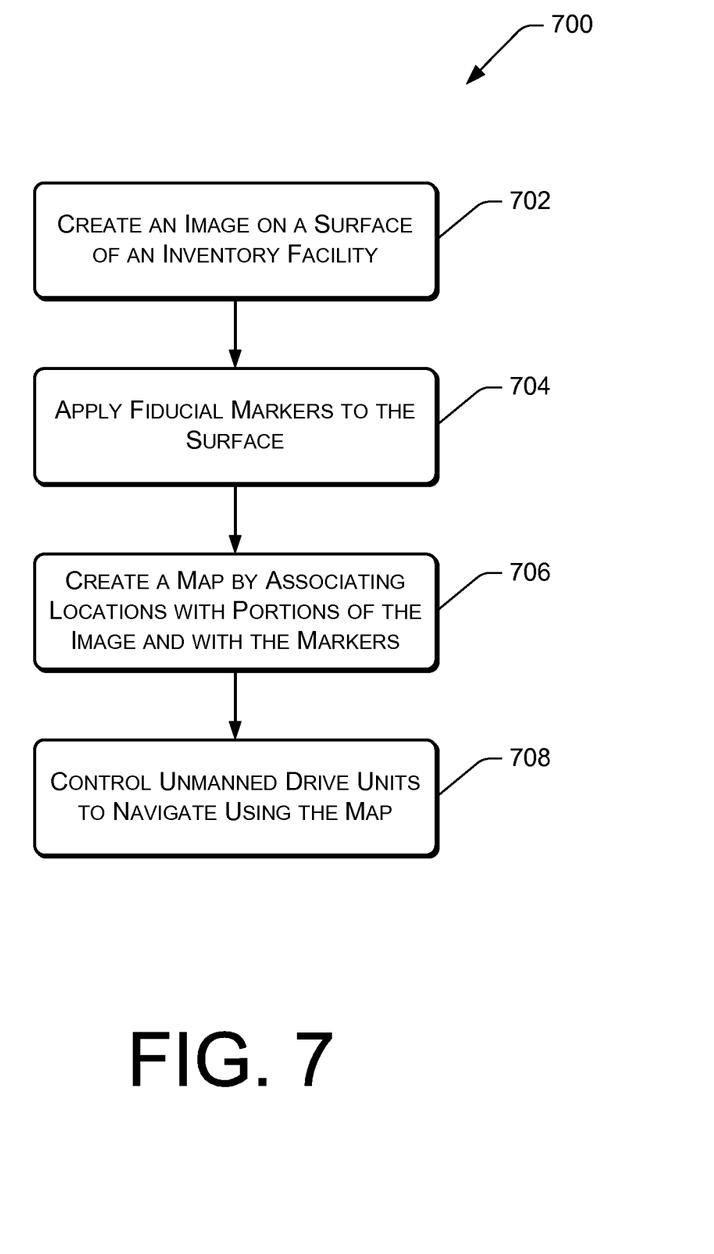
FIG. 7 illustrates a flow diagram of an example process for creating an identifiable pattern or image on a surface, creating a map of a facility that associates portions of the images to geographic locations within the facility, and controlling unmanned drive units with reference to the map.

FIG. 7 illustrates a flow diagram of an example process 700 for creating an image on a surface, creating a map of a facility that associates portions of the images to geographic locations within the facility, and controlling unmanned drive units with reference to the map. Although the process 700 (as well as other processes described herein) is describe in the context of the preceding figures, the process 700 may also be performed in other environments, in conjunction with various types of equipment and resources other than those that are specifically illustrated and mentioned.

Furthermore, each process described herein is illustrated as a logical flow graph, each operation of which may represent a sequence of operations that can be implemented using hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The process 700 includes, at 702, creating an image on a surface of an inventory facility. For instance, a robotic drive unit 106 and/or human workers may apply paint in one or more colors to a floor surface, may etch or burn an image into the floor surface, or the like. Furthermore, while this example describes applying an image to the floor, in other instances the image may be created on the ceiling or a wall of the facility.

At 704, the process 700 applies one or more fiducial markers to the surface for also aiding in a robotic drive unit's navigation of the workspace. For instance, a human worker may apply one or more barcodes to the floor surface atop the image, with the barcodes being utilized by robotic drive units to determine, with very high accuracy, its location within the workspace, given that each barcode is mapped to a particular location of the workspace.

At 706, the process 700 creates a map of a workspace by associating geographical locations with portions of the created image, potentially along with the fiducial markers applied at 704. At 708, the process 700 controls unmanned drive units using the map. For instance, the process 700 may instruct a particular device to move a portable inventory holder from a first location to a second location. The drive unit may then reference the map in order to determine how to get to the first location at which the portable inventory holder resides, as well as how to move the holder from the first location to the second location.

Figure 8:
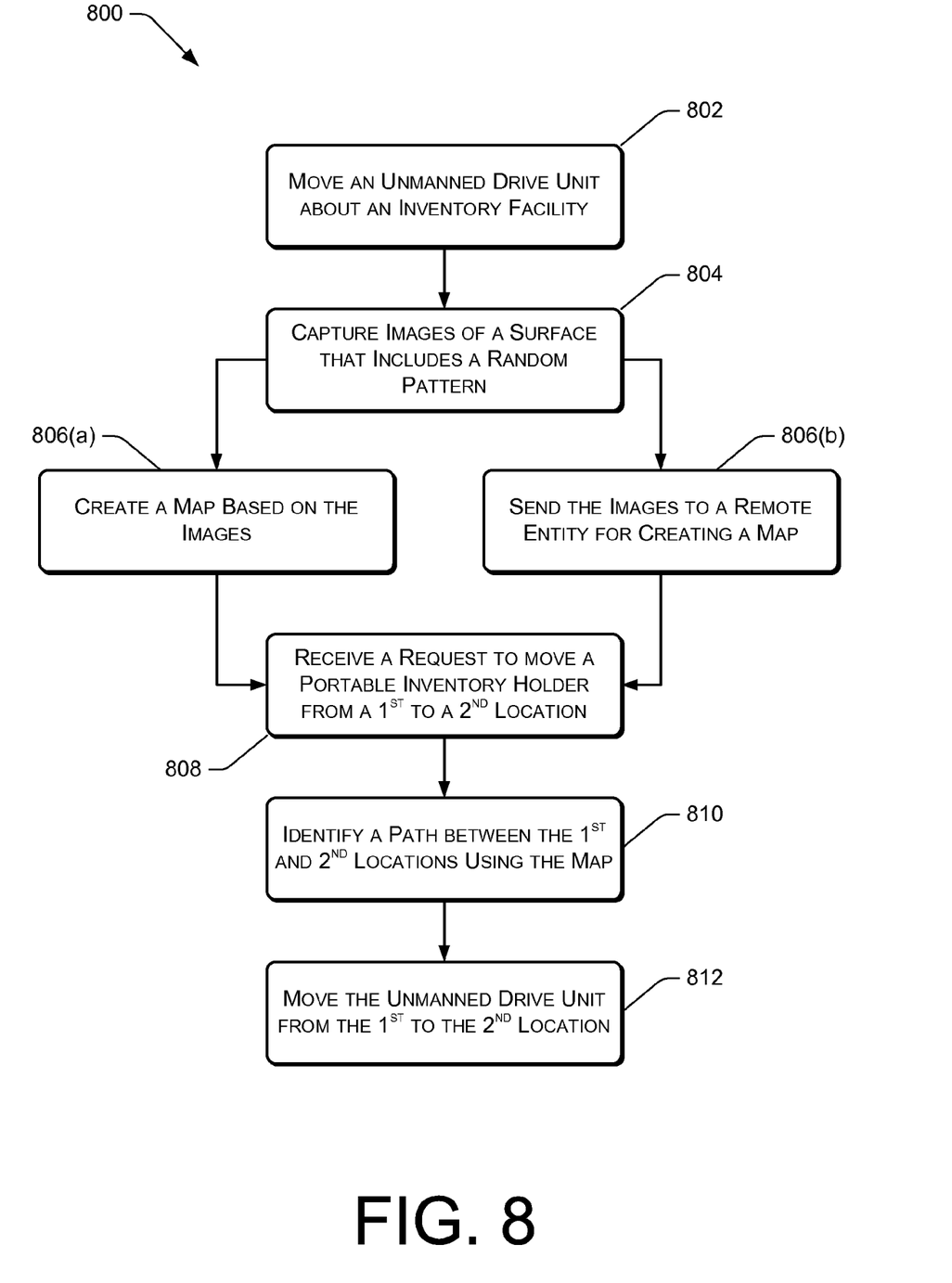
FIG. 8 illustrates a flow diagram of an example process for creating a map to use when controlling an unmanned drive unit about a facility, and using the map when doing so.

FIG. 8 illustrates a flow diagram of an example process 800 for creating a map to use when controlling an unmanned drive unit about a facility, and using the map when doing so. At 802, the process 800 moves an unmanned drive unit about an inventory facility. At 804, the process 800 captures images of a surface that includes a random pattern while the unit moves about the facility. At 806(a), the process 800 creates a map based on the images. For instance, an unmanned drive unit may create a map based on the captured images. In other instances, meanwhile, the process 800 sends the images to a remote entity for processing at 806(*b*).

The process 800 then receives, at 808, a request to move a portable inventory holder from a first location to a second location. At 810, the process 800 identifies a path between the first location and the second location using the map. For instance, the process 800 may determine portions of the image corresponding to a path of travel between the first location and the second location. At 812, the process 800 moves the unmanned drive unit from the first location to the second location, possibly with the drive unit carrying the portable inventory holder.

Figure 9:
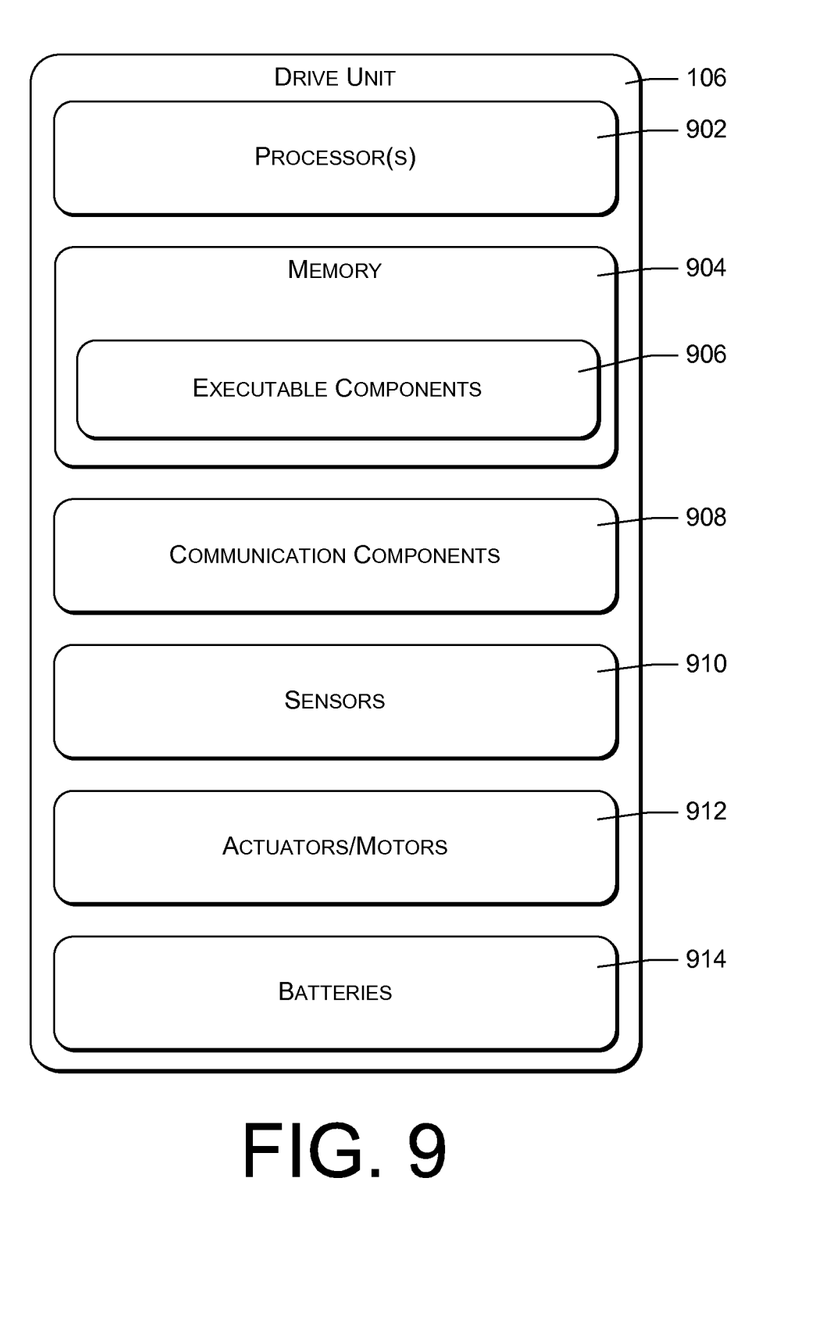
FIG. 9 is a block diagram illustrating example components of a unmanned (or "robotic") drive unit.

FIG. 9 shows relevant operational components of an example robotic drive unit 106 that may be used in conjunction with the techniques and systems described above. In a very basic configuration, an example drive unit 106 may have control logic in the form of one or more processors 902 and memory 904. Depending on the configuration of the drive unit and its control logic, the memory 904 may be a type of computer storage media and may include volatile and nonvolatile memory. Thus, the memory 904 may include, but is not limited to, RAM, ROM, EEPROM, flash memory, or other memory technology.

The memory 904 may be used to store any number of executable components 906 that are executable by the processor(s) 902. In many embodiments, these executable components comprise instructions or programs that are executable by the processor(s) 902, and that when executed implement operational logic for performing the actions and functions described above.

Executable components stored in the memory 904 may include navigational components, communication components, components, power management components, device drivers, and other software or firmware. Generally, the drive unit 106 is configured through by means of the executable components 906 to receive and act upon instructions from the management component 210 and to provide status information back to the management component 210.

The drive unit 106 may have communication components 908 such as wireless networking components or other components for providing wireless communications between the drive unit 106 and the management component 210.

Physical components of the drive unit 106 may include multiple sensors 910 such as optical sensors, cameras, position sensors, gyroscopes, compasses, position receivers, accelerometers, microphones, and so forth. The sensors 910 may be used for navigational purposes or for other purposes such as identifying inventory holders 104, determining status of various system or device elements and subsystems, and so forth.

Physical components may also include one or more actuators and/or motors 912, which may be used for engaging or docking with inventory holders 104, moving the drive unit over a surface, and so forth. The drive unit 106 may also include batteries 914 or another type of energy storage device for operating the various components described above.

The drive unit 106 may of course include many other elements and components that are not shown.

Figure 10:
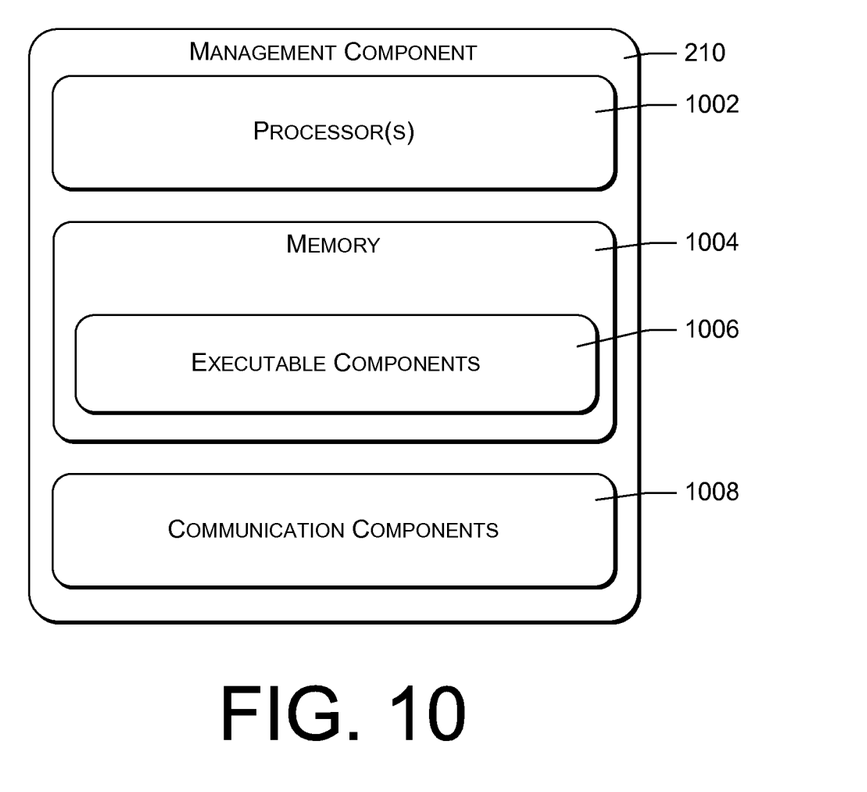
FIG. 10 is a block diagram illustrating example components of a management component.

FIG. 10 shows relevant operational components of an example management component 210 that may be used in conjunction with the techniques and systems described above. As discussed above, some or all of these components may additionally or alternatively reside in an unmanned drive unit 106. In a very basic configuration, an example management component 210 may have control logic in the form of one or more processors 1002 and memory 1004. Depending on the configuration of the management component 210 and its control logic, the memory 1004 may be a type of computer storage media and may include volatile and nonvolatile memory. Thus, the memory 1004 may include, but is not limited to, RAM, ROM, EEPROM, flash memory, or other memory technology.

The memory 1004 may be used to store any number of executable components 1006 that are executable by the processor(s) 1002. In many embodiments, these executable components comprise instructions or programs that are executable by the processor(s) 1002, and that when executed implement operational logic for performing the actions and functions described above.

Executable components stored in the memory 1004 may be configured to manage multiple robotic drive units. For example, the management component may specify instructions, locations, paths, inventory holders, and other information to the robotic drive units. In addition, the management component may implement a database or other type of logic for managing inventory items and their storage within an inventory facility. In some embodiments, the management component 210 may be configured to coordinate and direct all or most automated activities relating to robotic drive units and associated inventory holders.

The management component 210 may have communication components 1008 such as wireless networking components or other components for providing wireless communications between robotic drive units and the management component 210.

The management component 210 may of course include many other elements, components, and functionalities that are not specifically illustrated.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An order fulfillment system, comprising:
   a portable inventory holder configured to store inventory items at a first location in an inventory facility, the inventory facility including a floor surface having a random pattern of markings applied thereto; and
   a drive unit comprising a camera oriented substantially towards the floor surface and computer-executable instructions configured to direct the drive unit to perform actions comprising:
   moving the drive unit about the inventory facility;
   capturing images of at least a portion of the random pattern applied to the floor surface using the camera while the drive unit moves about the inventory facility;
   creating a map of the inventory facility that associates, with use of the images, respective portions of the random pattern to respective geographical locations of the inventory facility;
   receiving a request to move the portable inventory holder from the first location to a second location in the inventory facility;
   determining a path between the first and second locations based at least in part on the map of the inventory facility; and
   moving the portable inventory holder along the path from the first location to the second location.

2. The order fulfillment system of claim 1, wherein the random pattern is at least applied to substantially the entire floor surface of the inventory facility that is free from portable inventory holders.

3. The order fulfillment system of claim 1, wherein the random pattern comprises multiple colors of paint applied to the floor surface of the inventory facility.

4. The order fulfillment system of claim 1, wherein the creating the map comprises:
sending the images to a remote entity; and
receiving the map from the remote entity.

5. The order fulfillment system of claim 1, the actions further comprising:
referencing the map to identify the path between the first and second locations.

6. A method, comprising:
applying markings to a surface of an inventory facility, wherein the markings form an identifiable pattern;
capturing images of respective portions of the identifiable pattern using a camera;
creating, by a processor and using the images, a map of the inventory facility by associating respective geographical locations of the inventory facility to the respective portions of the identifiable pattern on the surface; and
controlling drive units to navigate about the inventory facility, wherein the navigation is based at least in part on the map of the inventory facility.

7. The method of claim 6, wherein:
the map represents substantially the entire surface of the inventory facility; and
the drive units are configured to navigate through the inventory facility based at least in part on the identifiable pattern on the surface.

8. The method of claim 6, wherein the surface comprises a floor of the inventory facility, and the creating the identifiable pattern comprises applying paint to the floor, etching the identifiable pattern into the floor, or forming the floor with a material having a non-uniform pattern.

9. The method of claim 6, wherein the creating the identifiable pattern comprises applying paint to the surface using one or more drive units.

10. The method of claim 6, wherein the identifiable pattern is not perceptible to a human viewer.

11. The method of claim 6, further comprising applying one or more fiducial markers to the surface, and wherein the map further associates respective geographical locations to respective fiducial markers.

12. The method of claim 6, wherein the controlling comprises comparing identifiable patterns of the surface captured by the one or more drive units to the map to determine respective current locations of the one or more drive units.

13. The method of claim 6, wherein the drive units are unmanned drive units.

14. An apparatus comprising:
a body;
a camera attached to the body and directed substantially downwards;
a drive mechanism to move the apparatus; and
computer-executable instructions configured to direct the apparatus to perform actions comprising:
capturing, by the camera, images of respective portions of an identifiable pattern on a floor surface of an environment;
creating a map by associating the respective portions of the identifiable pattern in the images to respective locations within the environment;
receiving an instruction to move from a first location within the environment to a second location within the environment;
identifying, from the map, portions of the identifiable pattern corresponding to a path from the first location to the second location; and
moving, using the drive mechanism, the apparatus from the first location to the second location by comparing images of the floor surface captured by the camera to the portions of the identifiable pattern corresponding to the path.

15. The apparatus of claim 14, wherein the camera is configured to detect images that are not perceptible to a human viewer, and wherein the identifiable pattern on the floor surface is not perceptible to a human viewer.

16. The apparatus of claim 14, wherein the camera is configured to identify different colors, and wherein the identifiable pattern on the floor surface comprises multiple colors of paint applied on the floor surface.

17. The apparatus of claim 14, wherein the identifiable pattern on the floor surface comprises an etching that has been etched onto the floor surface.

18. The apparatus of claim 14, wherein the identifiable pattern on the floor surface is created based at least in part on a natural, non-uniform appearance of the floor surface.

19. The apparatus of claim 14, wherein the apparatus comprises a drive unit and the map is created at least partly using images captured by respective cameras associated with respective other drive units.

20. The order fulfillment system of claim 1, wherein the random pattern is not perceptible to a human viewer.

* * * * *